(12) United States Patent
Schmude et al.

(10) Patent No.: US 11,366,248 B2
(45) Date of Patent: Jun. 21, 2022

(54) COMBINING FORECASTS OF VARYING SPATIAL AND TEMPORAL RESOLUTION

(71) Applicants: International Business Machines Corporation, Armonk, NY (US); IHI Corporation, Tokyo (JP)

(72) Inventors: Johannes W. Schmude, White Plains, NY (US); Siyuan Lu, Yorktown Heights, NY (US); Hendrik F. Hamann, Yorktown Heights, NY (US); Akihisa Sakurai, Sagamihara (JP); Taku Izumiyama, Bunkyo (JP); Masao Hasegawa, Arakawa (JP)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 16/729,408

(22) Filed: Dec. 29, 2019

(65) Prior Publication Data

US 2021/0199850 A1    Jul. 1, 2021

(51) Int. Cl.
| | | |
|---|---|---|
| *G01W 1/00* | (2006.01) | |
| *G01W 1/10* | (2006.01) | |
| *G06F 17/16* | (2006.01) | |
| *G06N 20/10* | (2019.01) | |
| *G06N 3/08* | (2006.01) | |

(52) U.S. Cl.
CPC .............. *G01W 1/10* (2013.01); *G06F 17/16* (2013.01); *G06N 3/08* (2013.01); *G06N 20/10* (2019.01)

(58) Field of Classification Search
CPC .......... G01W 1/10; G06F 17/16; G06N 3/08; G06N 20/10
See application file for complete search history.

(56) References Cited

U.S. PATENT DOCUMENTS

| | | | |
|---|---|---|---|
| 9,411,072 B1 | 8/2016 | Dixon | |
| 10,460,170 B1* | 10/2019 | Adler | G06T 17/05 |
| 10,860,633 B2* | 12/2020 | Rogynskyy | G06F 16/24558 |
| 2016/0178803 A1 | 6/2016 | Haas et al. | |
| 2017/0131435 A1 | 5/2017 | Peacock et al. | |
| 2018/0038994 A1 | 2/2018 | Hamann et al. | |
| 2018/0225585 A1* | 8/2018 | Dong | G06F 17/16 |

* cited by examiner

*Primary Examiner* — Elias Desta
(74) *Attorney, Agent, or Firm* — Daniel Morris; Otterstedt, Wallace & Kammer, LLP

(57) ABSTRACT

A method of generating an aggregate forecast includes obtaining historical forecasts for a number of time steps and at least one location, obtaining historical conditions for the time steps and the at least one location, training a machine learning algorithm to produce an aggregate historical forecast in response to the historical conditions and the historical forecasts, and producing an aggregate current forecast by running the trained machine learning algorithm on current forecasts. The historical forecasts and the current forecasts vary in at least one of spatial resolution or temporal resolution, and include a first forecast that is valid for a first time step and a second forecast that is valid for a second time step.

17 Claims, 10 Drawing Sheets

|  | Forecast (Ensemble) $A_1$ | Forecast (Ensemble) $A_2$ | Forecast (Ensemble) $A_3$ | ... | Forecast (Ensemble) $A_M$ | Aggregate Forecast |
|---|---|---|---|---|---|---|
| Time $x_0$ | Data | No Data | Data | ... | No Data | Data |
| Time $x_1$ | Data | Data | No Data | ... | No Data | Data |
| Time $x_2$ | No Data | No Data | Data | ... | No Data | Data |
| Time $x_3$ | No Data | Data | No Data | ... | Data | Data |
| Time $x_4$ | No Data | Data | No Data | ... | Data | Data |
| Time $x_5$ | Data | No Data | No Data | ... | No Data | Data |
| Time $x_6$ | Data | Data | No Data | ... | Data | Data |
| Time $x_7$ | Data | No Data | No Data | ... | No Data | Data |
| Time $x_8$ | Data | Data | No Data | ... | No Data |  |
| ... | ... | ... | ... | ... | ... | ... |
| Time $x_N$ | No Data | Data | No Data | ... | Data | Data |

*FIG. 2*

COMBINING FORECASTS OF VARYING SPATIAL AND TEMPORAL RESOLUTION

BACKGROUND

The present invention relates to the electrical, electronic, and computer arts, and more specifically, to big data and to predictive modeling of complex systems.

Computing systems frequently are applied to predictive modeling of complex systems involving large data sets. Sometimes computers are used to combine multiple models of a complex system to arrive at a consensus estimate of the system's future behavior. Sometimes one or more of the multiple models varies from others of the multiple models in its spatial or temporal resolution.

Consider the example of weather forecasts. Contemporary weather forecasts are generated by numerical weather prediction (NWP) systems that solve physical equations describing the behavior of the atmosphere, the oceans, their interactions etc. based on initial conditions that reflect the weather at the time the forecast was generated. In other words, NWP systems consider the state of the earth and atmosphere at a certain time and solve equations to predict the state of the earth and the atmosphere in the future. The output of such systems is not continuous, but discrete, in space and time and thus characterized by both a spatial and temporal resolution.

Moreover, operational NWP systems issue their forecasts on some periodic schedule. For some systems this might be several times a day (e.g. every six hours), for others this is a few times a week etc. Forecast systems also differ in the forecast horizon, that is, the maximum time step in the future for which they issue predictions.

Finally, many NWP forecast systems do not only issue a single forecast, but an ensemble of forecasts. That is, they issue multiple predictions for each parameter. Here "parameter" refers to things such as temperature and pressure. Subsequently it is possible to compare the various predictions made by the various ensemble members to calculate a likelihood of the average prediction. These characteristics do not only apply to weather forecasts (or NWP model output), but to many other forecasting systems.

Some types of forecasts (e.g. for commodity prices at specified delivery locations) may not have spatial dependence but do have temporal dependence; others might be purely spatial.

SUMMARY

Principles of the invention provide techniques for combining forecasts of varying spatial and temporal resolution. In one aspect, an exemplary method includes obtaining a plurality of historical forecasts for a plurality of time steps and at least one location among a plurality of locations; obtaining a plurality of historical conditions for the plurality of time steps and the at least one location; training a machine learning algorithm to produce an aggregate historical forecast in response to the plurality of historical conditions and the plurality of historical forecasts; and producing an aggregate current forecast by running the trained machine learning algorithm on at least a plurality of current forecasts. In one or more embodiments, the plurality of historical forecasts and the plurality of current forecasts vary in at least one of spatial resolution or temporal resolution. In one or more embodiments, the plurality of historical forecasts and the plurality of current forecasts include a first forecast that is valid for a first time step and a second forecast that is valid for a second time step.

One or more embodiments of the invention or elements thereof can be implemented in the form of a computer program product including a computer readable storage medium with computer usable program code for performing or facilitating the method steps indicated. Furthermore, one or more embodiments of the invention or elements thereof can be implemented in the form of a system (or apparatus) including a memory that embodies computer executable instructions, and at least one processor that is coupled to the memory and operative by the instructions to perform or to facilitate exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

In view of the foregoing, techniques of the present invention can provide substantial beneficial technical effects. For example, one or more embodiments provide one or more of:

Seamless integration of forecasts that vary in spatial and/or temporal resolution.

Improved accuracy of consensus estimates for future behavior of complex systems.

Maximization of spatial and temporal resolution of forecasts by generating a consensus forecast characterized by having the maximum spatial and temporal resolution present among the integrated forecasts.

These and other features and advantages of the present invention will become apparent from the following detailed description of illustrative embodiments thereof, which is to be read in connection with the accompanying drawings.

BRIEF DESCRIPTION OF THE DRAWINGS

FIG. 2 depicts an aggregation of forecasts in the temporal scale;

DETAILED DESCRIPTION

Figure 1:
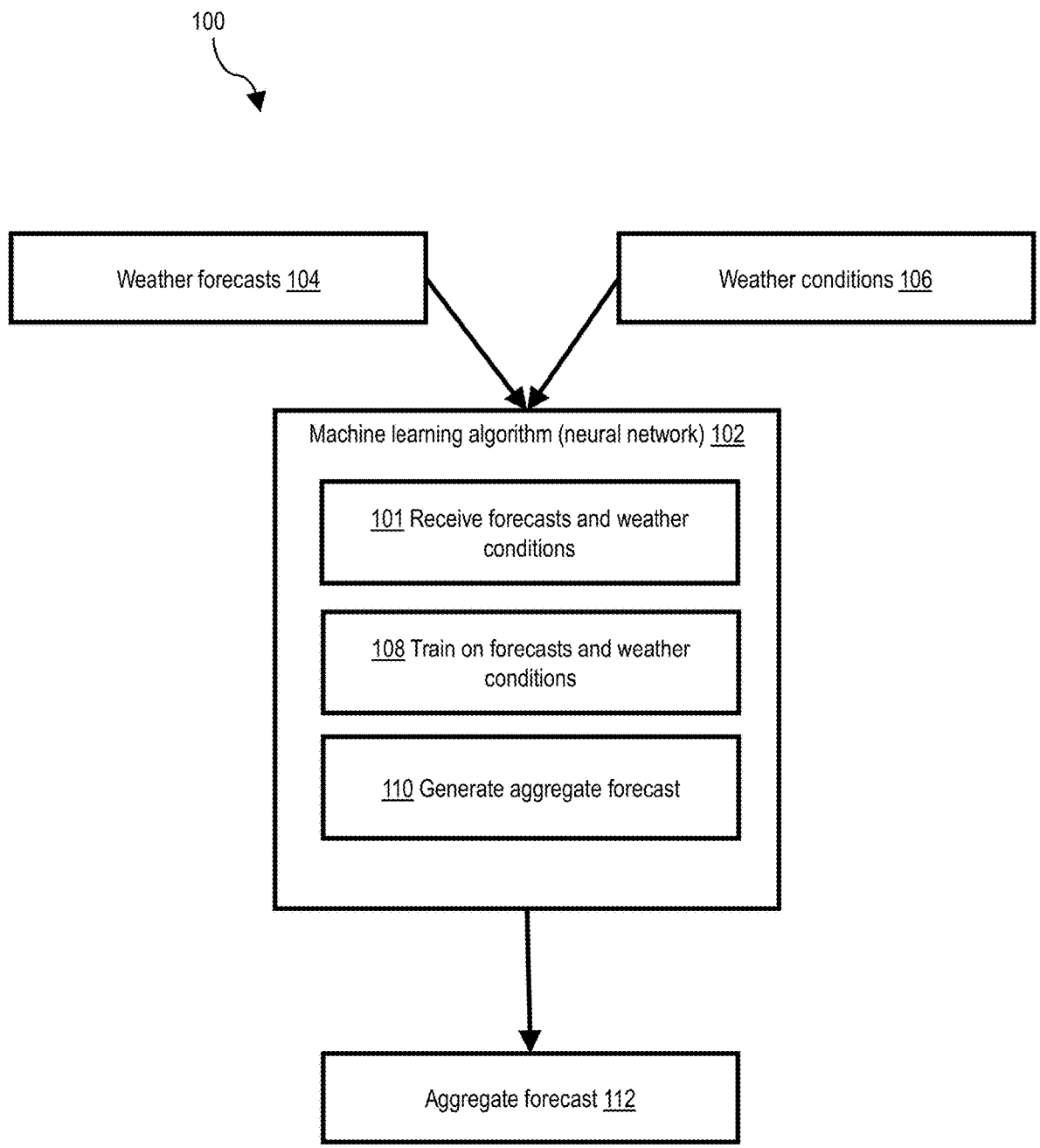
FIG. 1 depicts a method for generating aggregate forecasts of at least one variable that is distributed in at least one of time and space, according to an exemplary embodiment.
Figure 4:
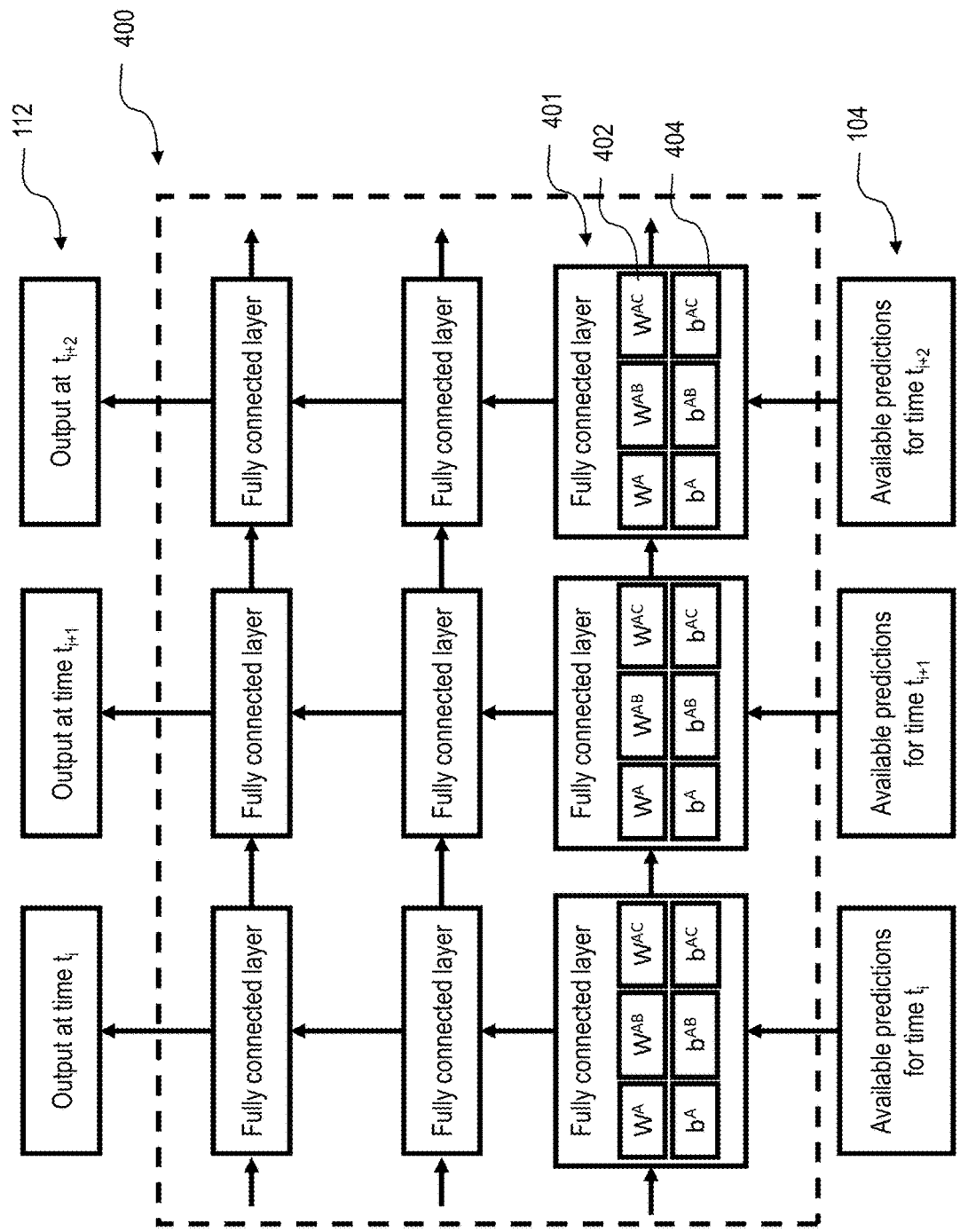
FIG. 4 depicts an exemplary neural network architecture for implementing the method of FIG. 1.
Figure 5:
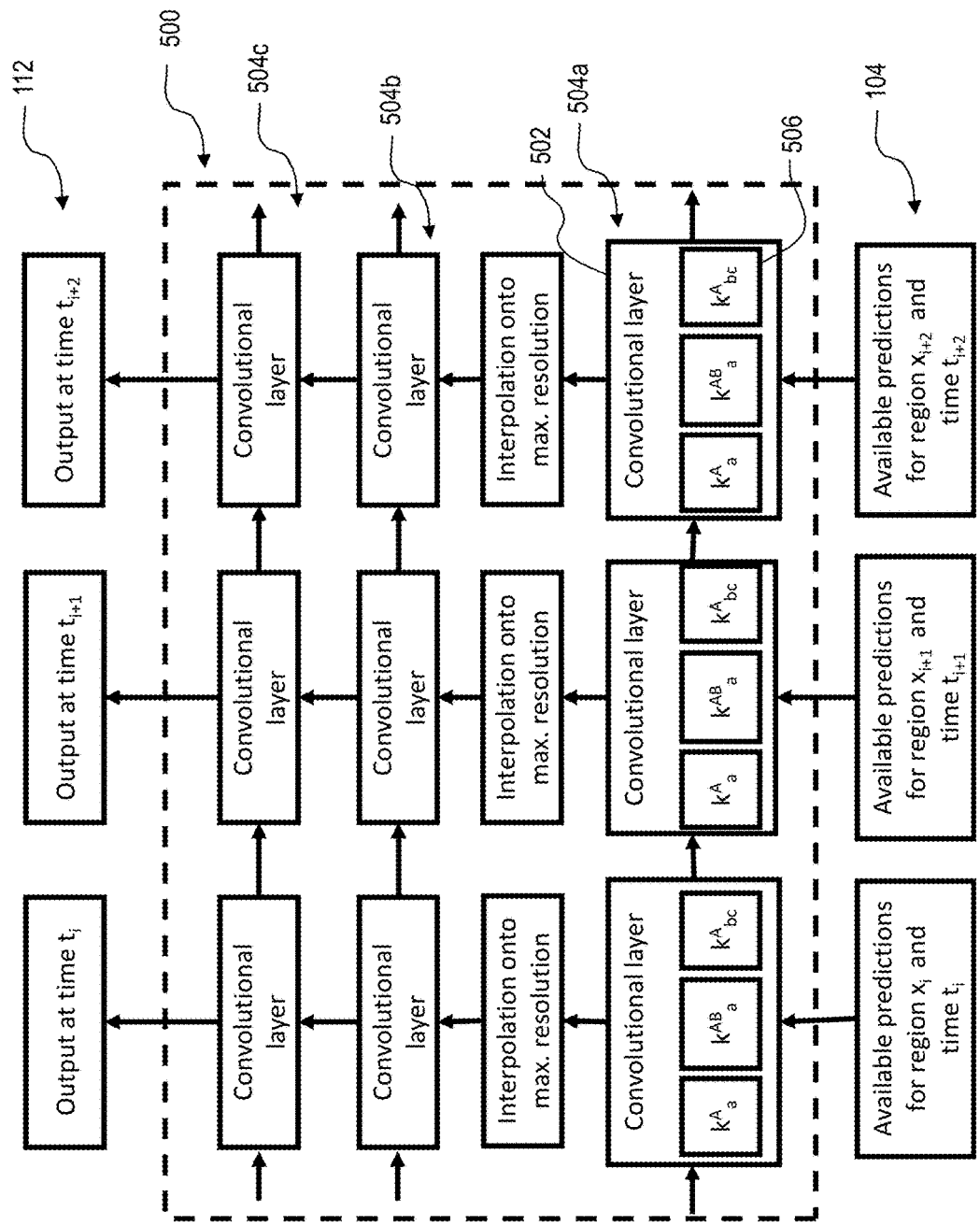
FIG. 5 depicts an exemplary embodiment in which a recurrent convolutional neural network (R-CNN) is used to generate an aggregate forecast.

FIG. 1 depicts a method 100 in which, at 101, a machine learning algorithm (e.g., a neural network) 102 receives forecasts 104 (e.g., weather forecasts) and historical (e.g., weather) conditions 106 of varying spatial and temporal resolution. At 108, the machine learning algorithm 102 is trained on the historical forecasts 104 and on the historical conditions 106 that include a combination of sensor measurements (e.g., stationary weather stations, non-stationary sensors, satellite) and climate re-analysis (depending on availability). At 110, the machine learning algorithm 102 generates an aggregate forecast 112 that aggregates the input forecasts timestamp-by-timestamp. Thus, for each timestamp for which a prediction was issued by any of the input forecasts, the machine learning system (neural network) 102 issues a prediction (aggregate forecast) 112 that takes into account some or all of the predictions 104 that were input to the neural network for that time and for preceding times. Generally, the neural network 102 learns from the weather forecasts 104 and from the historical weather conditions 106, which forecasts 104 to account for or which (if any) to discount. Exemplary machine learning algorithms 400, 500 are shown in FIGS. 4 and 5 respectively.

Generally, the input forecasts do not provide data for the same timestamps. Some models generate a daily forecast with a six hour time step, others generate a bi-weekly forecast with a 24 hour time step, etc. For example, FIG. 2 depicts in a chart a union or aggregation 200 in the temporal scale of forecasts $A_1 \ldots A_M$ numbered 201, 202, 203, 204. Note that Forecast $A_1$ has data for times $x_0, x_1, x_5 \ldots x_8$ but has no data for the other timesteps. On the other hand, Forecast $A_2$ has data for times $x_1, x_3, x_4, x_6, x_8$, and $x_N$ but for no other timesteps. Forecasts $A_3 \ldots A_M$ supply data for other time steps so that the aggregate forecast has data for all timesteps.

Figure 3:
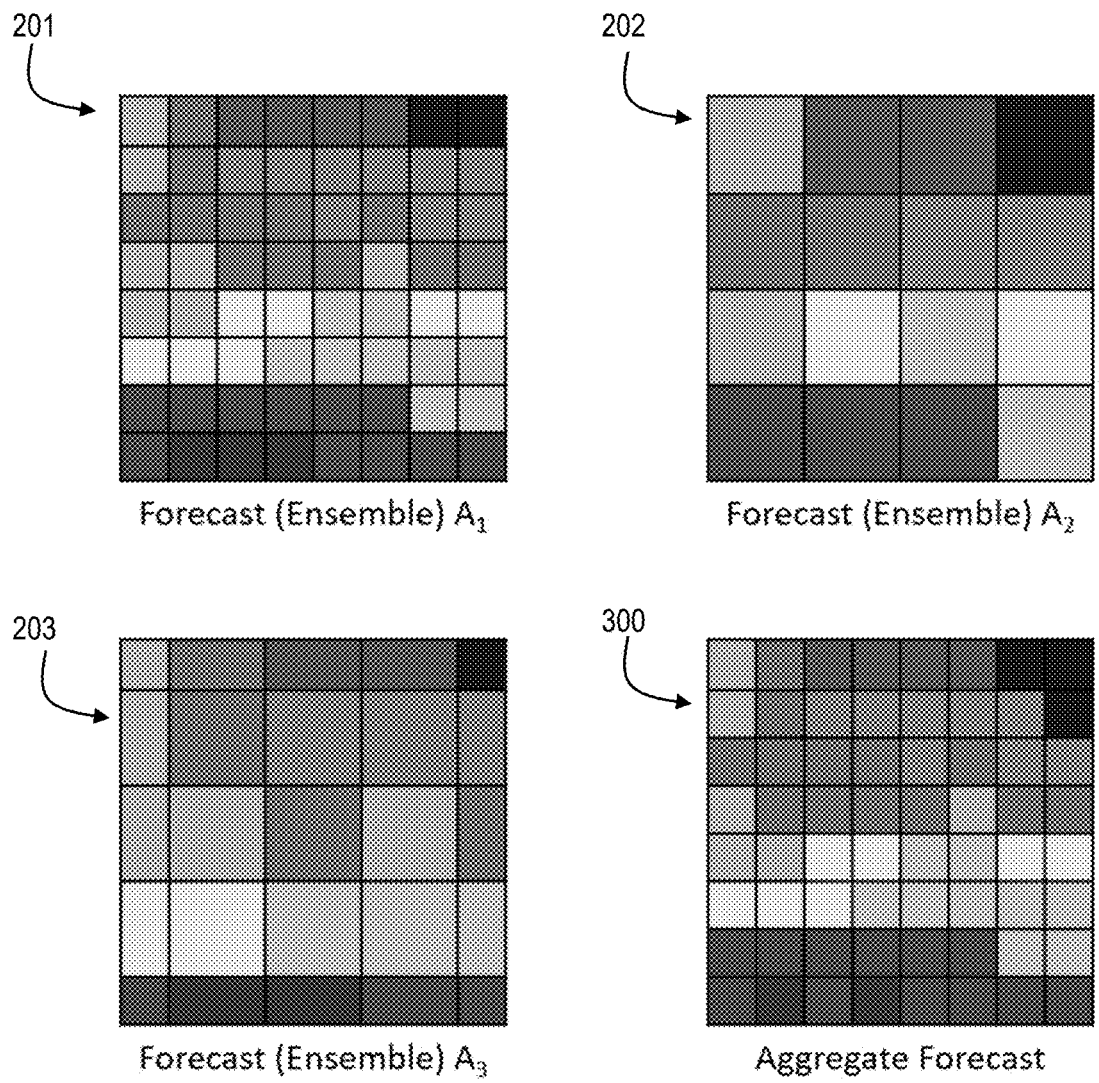
FIG. 3 depicts an aggregation of forecasts in the spatial scale.

As another example, FIG. 3 depicts a union or aggregation 300 in the spatial scale of forecasts $A_1 \ldots A_3$ numbered 201, 202, 203 corresponding to FIG. 2. Note that Forecast $A_1$ has 8×8 grid resolution, Forecast $A_2$ has 4×4 grid resolution, and Forecast $A_3$ has 4×4 grid resolution displaced by 0.5 grid segments vertically and horizontally from Forecasts $A_1, A_2$. The aggregate forecast has 8×8 grid resolution aligned to the majority reference of Forecasts $A_1, A_2$.

To give a concrete example. Consider weather models A and B. A operates with a 6-hour time step. I.e. there are predictions for 0, 6, 12, 18 UTC. B on the other hand operates with a 24-hour time step, so there are only predictions for 0 UTC. For simplicity, assume that both forecasts were released on a Sunday. To make a prediction for 0 UTC Monday morning, the predictions from both models A and B can be aggregated. Here, the precise mathematical operation performing the aggregation depends on the implementation of the neural network. Generally the aggregate forecast is described by a function f(A,B) whose parameters are learned by training the neural network 102 against historical weather data 106 using historical forecasts 104. For 6 UTC, only the prediction from model A is available. The aggregate prediction will depend only on the output of A as well as the input data at 0 UTC (since the network is recurrent). For 12 and 18 UTC the situation is similar. For 0 UTC on Tuesday morning, there is again data from models A and B, so now the output is dependent on A, B at 0 UTC and previous values. Thus, the temporal resolution of the aggregate forecast 112 corresponds to the union of time stamps available in the input forecasts 104 and thus to the highest temporal resolution given the input data.

The neural network 102 learns by training 108, which uses an objective function to minimize variance (in past time) from the aggregate forecast 112 to the historical weather conditions 106.

Consider the following notation. One or more embodiments relate to predictions 104 made by numerical weather forecast systems (or other forecasting systems, e.g., commodities pricing forecasts). In general, denote a prediction 104 as p. Forecasting systems often do not predict a single parameter, such as temperature or price, but instead predict a vector of parameters, such as temperature, pressure, humidity and wind speed or price and availability. To capture all parameters of a prediction 104, add an index a, for $p_a$ to refer to one of the entire set of parameters. Naturally, a forecast is valid for a specific date and time (i.e. the forecast is meant to predict the conditions at that date and time), which is denoted by another index, t, for $p_{at}$. However, the time the forecast is for (the valid time) is not the only time associated with a forecast. Another relevant feature of each prediction 104 is when the forecast was made (or issued): the issue time. Instead of using the issue time to label the forecast, introduce an index for horizon h, the difference between issue time and valid time (h=valid time−issue time) and write Path. Furthermore, there are cases where a forecasting agency does not run only a single forecast, but instead runs multiple forecasts/predictions Path for the same choice of indices a, t, h. Essentially the agency generates an ensemble of predictions 104 by re-running the simulations that generate each prediction 104, using for each run slightly different initial conditions (e.g., variations around the measured historical weather conditions 106 at the time the forecast is calculated). To capture this, introduce yet another index i that indicates which ensemble member is being considered, $p_{athi}$. One or more embodiments concern a machine learning method to aggregate predictions 104 made by different models and/or agencies. Thus, introduce a model/agency index A to discriminate the different models: $p^A_{athi}$. In principle, the possible choices of a, t, h and i depend on the model A. Some models are large ensemble forecasts with, say 50 ensemble members, so i can take values from 1 to 50. Other models have few ensemble members or are single forecasts. Similarly, some forecasts predict in 24 hour steps up to 30 days ahead (h=0; 1, 2, : : : , 30 days), while others might operate in hourly steps up to 5 days ahead. Finally, different forecast models predict different parameters. As a consequence, formal notation should garnish the subscripts a, t, h and i with superscripts A to emphasize their dependence on A. Yet since that notation would be rather cumbersome, write $p^A_{athi}$ and take the dependence of A to be understood.

Thus, given some ground truth $y_t$ (e.g., historical measured conditions 106) at times $t_1; t_2; t_3; : : :$ etc., then at 108 train the neural network 102 to predict $y_t$ using the set $p^A_{athi}$ (e.g., historical forecasts 104 that are valid for each time t). In general, y will be something such as temperature measured by a weather station or reported by an analysis or re-analysis data product. Note however, although temperature is often included in weather predictions $p^A_{athi}$ for some choice of A and a, it is not necessary for the predictors $p^A_{athi}$ to include the same variable that is to be predicted. Thus, given a ground truth y (historical conditions 106) that includes a variable x, the neural network 102 can be trained to predict x based on predictions $p^A_{athi}$ that do not include x. In other words, there can be missing data among the inputs. A conventional way to deal with this in a deep learning context is to replace the missing values with some dummy values (e.g., 0) and then add some mask to the inputs that tells the neural network which values are to be considered missing. The obvious drawback is that this doubles the number of inputs and thereby increases the number of parameters in the neural network. However, in the context described above, what is missing and what is not follows clear, regular patterns. This allows an alternative (according to one or more embodiments) to filling in missing values and adding a mask.

To give an example in the temporal dimension, consider two forecasts A and B. A issues predictions at times $t_1$; $t_2$; $t_3$; $t_4$; : : : . B on the other hand issues predictions only at $t_2$; $t_4$; $t_6$; : : : . At time $t_1$, use $p^A_{at1hi}$ to predict $y_{t1}$ while at the next time step both $p^A_{at2hi}$ as well as $p^B_{at2hi}$ are available. Recall that a trivial recurrent neural network considers an input $x_t$ at time step t, as well as an internal state vector $h_{t-1}$ inherited from the previous time step, and uses these to generate an output $o_t$ as well as a new internal state vector $h_t$. (Without loss of generality, simplify to $h_t = o_t$.) Such a conventional neural network generates $o_t$ by using a weight matrix W, bias vector b and activation function φ and performing the calculation $$h_t = \varphi\left(W\begin{pmatrix}x_t\\h_{t-1}\end{pmatrix} + b\right). \quad \text{(Eq. 1)}$$

Often, recurrent networks stack multiple such structures on top of each other. That is, the output $o_t$ serves as the input $x_{t+1}$ to the next layer. Then the weight matrix in the lowest layer is $W_0$, the weight matrix in the next lowest level is $W_1$, and so on.

However, one or more embodiments do not use the same single weight matrix $W_0$ at the lowest level, but instead select from a plurality of weight matrices according to dimensionality of the input $x_t$. Referring to the above example with the forecasts A and B, this case would have a set of two weight matrices and possible bias vectors. At time $t_1$, use the weight matrix We to make the calculation $$h_{t_1} = \varphi\left(W_0^A \begin{pmatrix}p^A_{at_1hi}\\h_{t_0}\end{pmatrix} + b\right). \quad \text{(Eq. 2)}$$

On the other hand, at the next time step, $t_2$, use the weight matrix $W_0^{AB}$ to calculate $$h_{t_2} = \varphi\left(W_0^{AB}\begin{pmatrix}p^A_{at_2hi}\\p^B_{at_2hi}\\h_{t_1}\end{pmatrix} + b\right). \quad \text{(Eq. 3)}$$

In other words, a set of weight matrices $W_0^l$ embed a plurality of available input forecasts into a suitable latent space. Even if the dimensionality of the space of input data changes at each step $t_1$; $t_2$, the dimensionality of the latent space is always the same. Thus, if $W_0^l$ is a matrix with shape $\alpha_l \times \beta_l$, then $\alpha_l$ is independent of l while $\beta_l$ is not.

One way of training the neural network 102 is to use a recurrent neural network 400 (as shown in FIG. 4) that considers the series of time steps t=$t_1$; $t_2$; $t_3$; : : : etc. and uses for each time step t the predictors $p^A_{athi}$, 104 as inputs. In general, the inputs used for the neural network are predictions 104 that were issued by different weather models for each particular day and time. However, since weather agencies run their weather models several times a day, week or month, usually there are several predictions 104 by the same model for the same date and time with different horizons h. Thus, it is possible to use not only the latest prediction 104, but also older predictions 104 as inputs. The choice how many previous predictions from each model to use is a hyper parameter 114 that can be tuned during training—either manually, or as a parameter to be learned. Moreover, weather conditions 106 that were predominant at the time the forecasts 104 were made can be used as additional inputs to the machine learning system.

In one or more embodiments the machine learning algorithm 102 may be a deep learning algorithm, e.g., a recurrent neural network. One implementation (for aggregating predictions with differing temporal dimensions) is with recurrent neural networks (RNN) whether simple (Elman), LSTM, GRU et cetera. FIG. 4 depicts an exemplary neural network architecture 400 (a simple RNN) for implementing the method 100 shown in FIG. 1. In contrast to a conventional recurrent neural network architecture, in one or more embodiments the inventive neural network architecture 400 replaces the conventional single weight matrix and bias vector of a lowest level 401 of the RNN with a plurality of weight matrices 402 (e.g., $W_0^A$, $W_0^{AB}$, $W_0^{AC}$) and bias vectors 404 (e.g., (e.g., $b_0^A$, $b_0^{AB}$, $b_0^{AC}$). Which matrix (and vector) are used during training and forecasting, from the plurality of matrices and vectors, depends on the set of available predictions 104 for this time step.

The generalization to LSTM and GRU is straightforward. That is, both LSTM and GRU are examples of recurrent neural network structures, generalizing the principle of equation 1. The relevant part is that equation 1 features an input $x_t$, $h_{t-1}$ that depends on time and produces and output state $h_t$ that depends on time, yet the weight matrix and bias vector are independent of t. Both LSTM and GRU networks generalize this concept, except that there are more equations, more internal states and more weight matrices and bias vector. A concrete example of an LSTM is given by the system of equations $$f_t = \sigma_g(W_f x_t + U_f h_{t-1} + b_f) \quad \text{(Eq. 4)}$$

$$i_t = \sigma_g(W_i x_t + U_i h_{t-1} + b_i) \quad \text{(Eq. 5)}$$

$$o_t = \sigma_g(W_o x_t + U_o h_{t-1} + b_o) \quad \text{(Eq. 6)}$$

$$c_t = f_t \circ c_{t-1} + i_t \circ \sigma_c(W_c x_t + U_c h_{t-1} + b_c) \quad \text{(Eq. 7)}$$

$$h_t = o_t \circ \sigma_h(c_t) \quad \text{(Eq. 8)}$$

Here, $\sigma_g$, $\sigma_c$ and $\sigma_h$ denote different activation functions (usually sigmoid or hyperbolic tangent); the various W and U represent activation matrices and b bias vectors that are learned during training. As before, $x_t$ is an input while the various additional vectors $h_t$, $c_t$, $f_t$, $i_t$, and $o_t$ generalize the internal state vector $h_t$ from the simpler case. To generalize to the case at hands, one has to replace both the weight matrices W and possibly bias vectors b with sets of weight matrices and bias vectors that depend on the available input data (e.g., $W_0^A$, $W_0^{AB}$, $W_0^{AC}$). Optionally one could do the same with U. Again, the concept is the same as before: The lowest level of the LSTM embeds the available input data into a latent space on which the higher levels operate independently of what input data might be available.

When the forecasts 104 and the conditions 106 (in one or more embodiments, not limited to weather forecasts or weather conditions) have a spatial component, each fully connected layer (with its corresponding pluralities of weight matrices and bias vectors) can be replaced with a convolutional layer (and a corresponding plurality of convolutional kernels for the lowest layers). FIG. 5 depicts an embodiment in which a recurrent convolutional neural network (R-CNN) 500 is used to generate an aggregate forecast 112 from a plurality of historical forecasts 104. The recurrent convolutional neural network 500 includes a plurality of convolutional blocks 502 that are arranged in recurrent layers 504a-c. At the lowest layer 504a, each convolutional block 502 includes a plurality of kernels 506 (e.g., $k^A_a$, $k^{AB}_a$, $k^A_{bc}$, from which the R-CNN 500 learns to select an appropriate kernel that corresponds to the historical forecasts 104 and historical conditions 106 that are available for a given timestep. Data sources which have a coarser resolution than the maximum available get interpolated onto the highest resolution available. This can be a simple interpolation algorithm such as nearest neighbor or bilinear interpolation.

Figure 6:
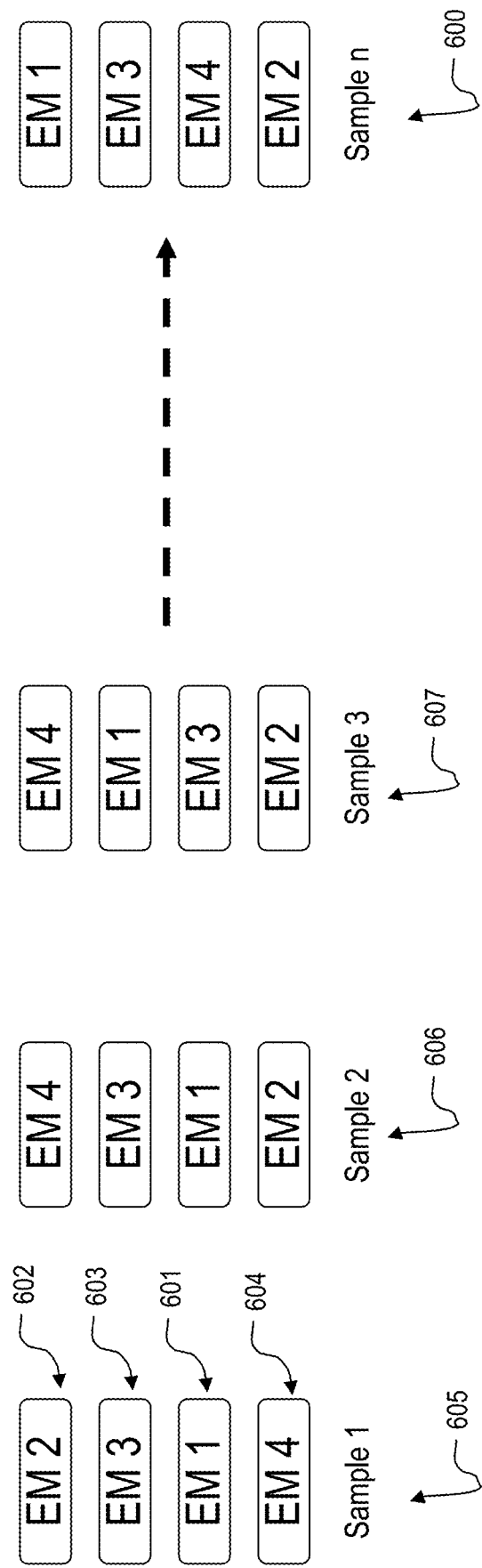
FIG. 6 depicts a permutation of input models for training a neural network on ensemble model forecasts, according to an exemplary embodiment.

Referring to FIG. 6, if any of the input forecasts 104 is an ensemble forecast, the system continuously permutes the input models 601, 602, 603, 604 (e.g., $EM_1 \ldots EM_4$ for a four model ensemble) during training on multiple samples 605, 606, 607 (e.g., Samples 1 . . . 3). On the other hand, to generate a forecast, ensemble members are kept in their original order 600. This leads to augmentation of the training data by about n!, where n is the number of models in an ensemble, e.g., by 4!=24 for a four model ensemble as shown in FIG. 6.

Figure 7:
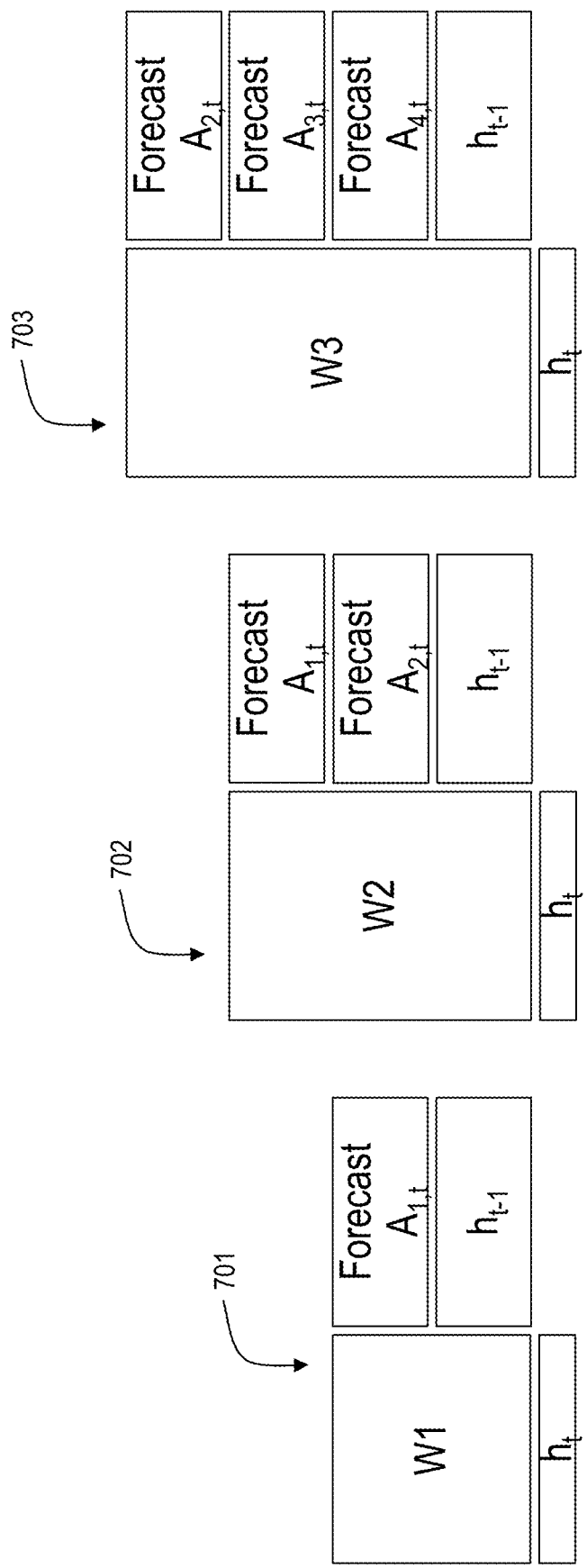
FIG. 7 depicts use of different neural network filters corresponding to availability of input models.

The machine learning algorithm 102 uses different filters (i.e., weight matrices and bias vectors) depending on which forecasts are available for a given forecast time and time step. For example, in one or more embodiments the filters are selected in response to characteristics (e.g., time step, spatial resolution) of the forecasts. Thus, FIG. 7 depicts the use of different filters or kernels for a recurrent convolutional neural network (R-CNN), depending on data availability. The internal state $h_t$ of the network is updated at each time step using one of a plurality of kernels 701, 702, 703 (matrices W1, W2, W3, etc.) depending on the availability for each time step of different input forecasts $A_1, A_2, A_3, A_4$, etc. Note that this system can use weight sharing between the different matrices Wi.

Figure 8:
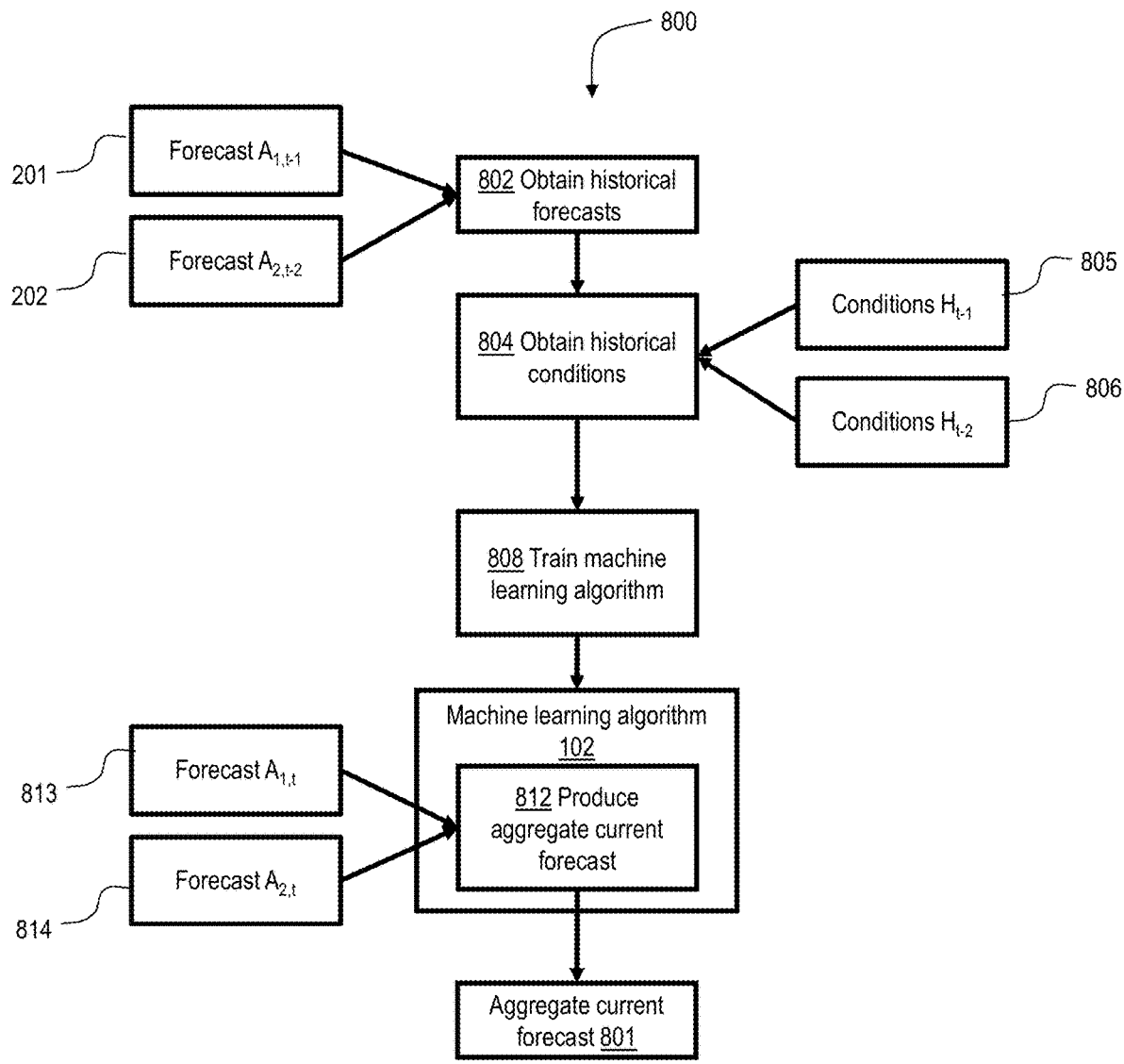
FIG. 8 depicts a method for generating an aggregate forecast, according to an exemplary embodiment.

FIG. 8 depicts a method 800 for generating an aggregate forecast 801, according to an exemplary embodiment. At 802, obtain a plurality of historical forecasts 201, 202, etc. each corresponding to one of a plurality of a time steps (as shown generally in FIG. 2). At 804, obtain a plurality of historical conditions 805, 806, etc. each corresponding to one of the plurality of a time steps. At 808, train the machine learning algorithm 102 (e.g., algorithm 400 as shown in FIG. 4 or algorithm 500 as shown in FIG. 5) to produce the plurality of historical conditions 805, 806, etc. in response to at least some of the plurality of historical forecasts 201, 202, etc. At 812, produce the aggregate current forecast 801 based at least on a plurality of current forecasts 813, 814, etc. (and optionally also on the plurality of historical forecasts 201. 202 and/or the plurality of historical conditions 805, 806) by running the trained machine learning algorithm 102 on at least the plurality of current forecasts. In one or more embodiments, the plurality of historical forecasts and the plurality of current forecasts vary in at least one of spatial resolution or temporal resolution, as shown generally in FIGS. 2 and 3. In one or more embodiments, the plurality of historical forecasts and the plurality of current forecasts include a first forecast that is valid for a first time step and a second forecast that is valid for a second time step (e.g., forecasts $A_1$ and $A_2$ as shown in FIG. 2).

Figure 9:
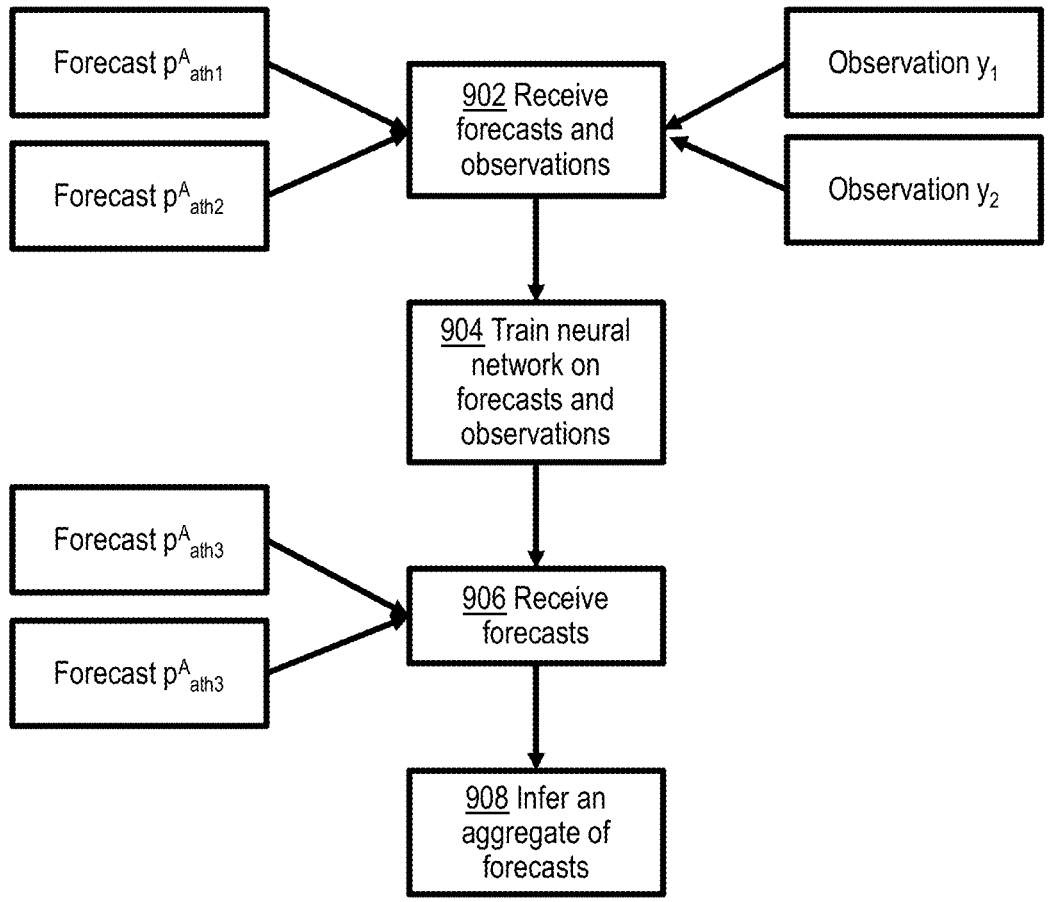
FIG. 9 depicts in a flowchart an algorithm for selecting neural network trainable parameters according to availability of input models.

FIG. 9 depicts in a flowchart an algorithm 900 for selecting filters to be used in an RNN, according to availability of input forecasts. At 902, receive prior predictions and observations (i.e. historical forecasts and conditions). At 904, train a recurrent neural network on the forecasts and observations. That is, for each time step $t=t_1; t_2; t_3; \ldots$ etc. establish whether there is a prediction from model A, from model B, or from both or from neither. Select a filter (weight matrix and bias vector) that corresponds to the available forecasts, e.g., $$h_i^0 = \varphi\left( W_0^{AB} \begin{pmatrix} p_{at_2 hi}^A \\ p_{at_2 hi}^B \\ h_{t_1} \end{pmatrix} + b_0^{AB} \right) \quad \text{(Eq. 9)}$$

Then the output of the neural network at time step t is calculated according to $$\hat{y}_1 = h_i^1 = \varphi\left( W_1 \begin{pmatrix} h_i^0 \\ h_{i-1}^1 \end{pmatrix} + b_1 \right).$$

Loss is calculated in the standard manner, and parameters can be optimized by stochastic gradient descent or any standard optimizer. At 906, receive additional forecasts. At 908, use the trained neural network to infer an aggregate of the additional forecasts.

Given the discussion thus far, and with reference to the accompanying drawings, it will be appreciated that, in general terms, an exemplary method, according to an aspect of the invention, includes at 902 obtaining a plurality of historical forecasts, each of which corresponds to one of a plurality of time steps and to one or more of a plurality of locations, and obtaining a plurality of historical conditions, each of which corresponds to one of the plurality of time steps and to one of the plurality of locations. Further, the method includes at 904 training a machine learning algorithm to produce an aggregate historical forecast in response to the plurality of historical conditions and the plurality of historical forecasts; and at 908 producing an aggregate current forecast by running the trained machine learning algorithm on at least a plurality of current forecasts. In one or more embodiments, the plurality of historical forecasts and the plurality of current forecasts vary in at least one of spatial resolution or temporal resolution. In one or more embodiments, the plurality of historical forecasts and the plurality of current forecasts include a first forecast that is valid for a first time step and a second forecast that is valid for a second time step.

In one or more embodiments, the machine learning algorithm is a recurrent neural network that incorporates a plurality of weight matrices and a plurality of bias vectors corresponding to differing temporal resolutions of the plurality of historical forecasts and the plurality of historical conditions.

In one or more embodiments, the machine learning algorithm is a recurrent convolutional neural network that incorporates a plurality of kernels corresponding to differing spatial resolutions of the plurality of historical forecasts and the plurality of historical conditions.

In one or more embodiments, the plurality of historical forecasts vary in temporal resolution, and accordingly, training the machine learning algorithm includes generating a first weight matrix and a first bias vector by running the machine learning algorithm on a first group of the plurality of historical forecasts and a first group of the plurality of historical conditions; and generating a second weight matrix and a second bias vector by running the machine learning algorithm on a second group of the plurality of historical forecasts and a second group of the plurality of historical conditions.

In one or more embodiments, the plurality of historical forecasts vary in spatial resolution, and accordingly, training the machine learning algorithm includes generating a first kernel by running the machine learning algorithm on a first group of the plurality of historical forecasts and a first group of the plurality of historical conditions, and generating a second kernel by running the machine learning algorithm on a second group of the plurality of historical forecasts and a second group of the plurality of historical conditions.

In one or more embodiments, running the trained machine learning algorithm includes running the first kernel on a first group of the plurality of current forecasts that are valid for a first time step and running the second kernel on a second group of the plurality of current forecasts that are valid for a second time step.

In one or more embodiments, producing the aggregate current forecast includes running the trained machine learning algorithm on the plurality of current forecasts and on at least one of the plurality of historical conditions.

Figure 10:
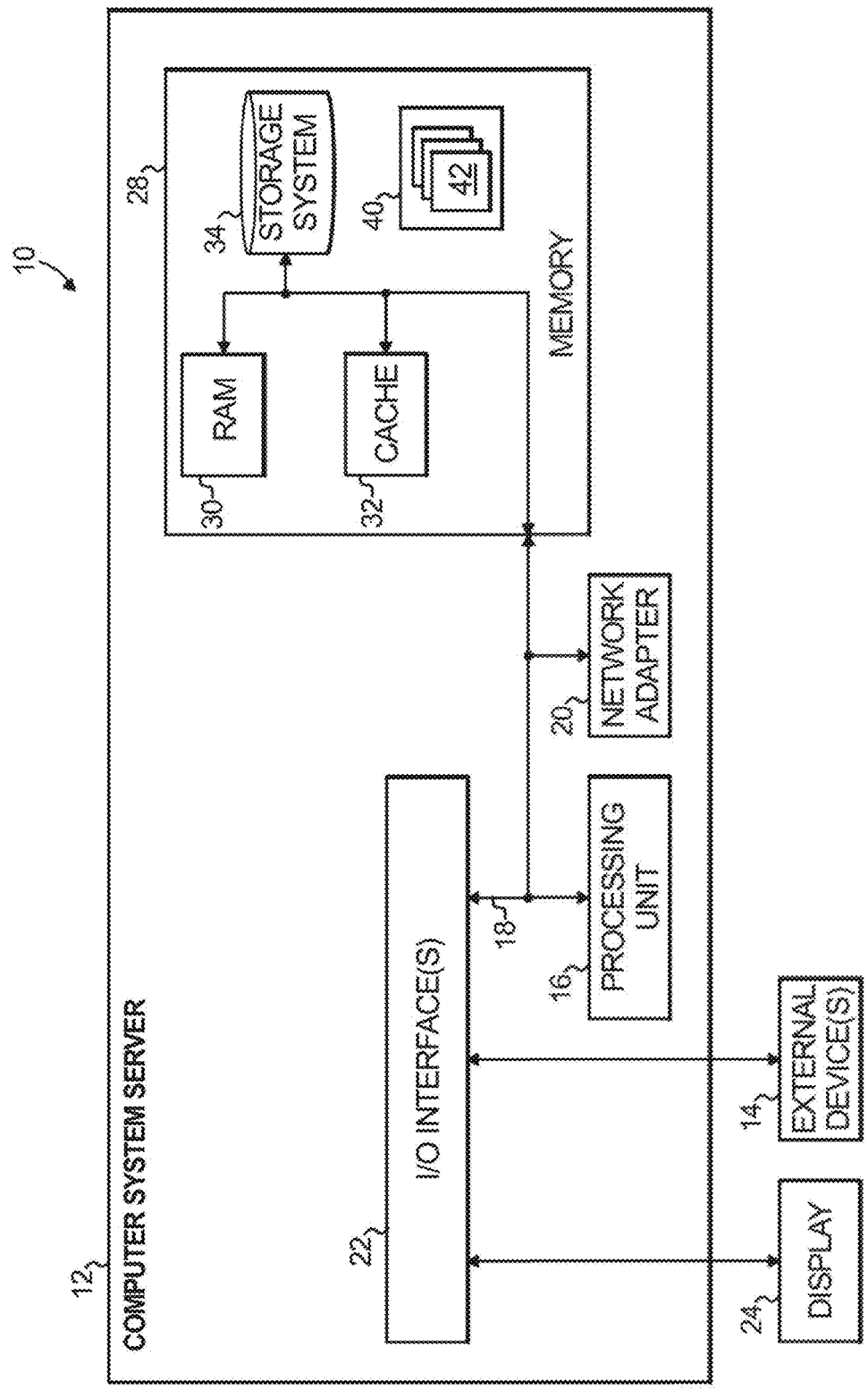
FIG. 10 depicts a computer system that may be useful in implementing one or more aspects and/or elements of the invention.

One or more embodiments of the invention, or elements thereof, can be implemented in the form of an apparatus including a memory and at least one processor that is coupled to the memory and operative to perform or to facilitate exemplary method steps, or in the form of a non-transitory computer readable medium embodying computer executable instructions which when executed by a computer cause the computer to perform or to facilitate exemplary method steps. FIG. 10 depicts a computer system that may be useful in implementing one or more aspects and/or elements of the invention.

Referring now to FIG. 10, computer system 10 is only one example of a suitable computer system and is not intended to suggest any limitation as to the scope of use or functionality of embodiments of the invention described herein. Regardless, computer system 10 is capable of being implemented and/or performing any of the functionality set forth hereinabove. In computer system 10 there is a computer server 12, which is operational with numerous other general purpose or special purpose computing system environments or configurations. Examples of well-known computing systems, environments, and/or configurations that may be suitable for use with computer server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer server 12 may be described in the general context of computer system executable instructions, such as program modules, being executed by a computer system. Generally, program modules may include routines, programs, objects, components, logic, data structures, and so on that perform particular tasks or implement particular abstract data types. Computer server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer server 12 in computer system 10 is shown in the form of a general-purpose computing device. The components of computer server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer server 12 typically includes a variety of computer system readable media. Such media may be any available media that is accessible by computer server 12, and it includes both volatile and non-volatile media, removable and non-removable media. System memory 28 can include computer system readable media in the form of volatile memory, such as random access memory (RAM) 30 and/or cache memory 32. Computer server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces.

As will be further depicted and described below, memory 28 may include at least one program product having a set (e.g., at least one) of program modules that are configured to carry out the functions of embodiments of the invention. Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer server 12 may also communicate with one or more external devices 14 such as a keyboard, a pointing device, a display 24, etc.; one or more devices that enable a user to interact with computer server 12; and/or any devices (e.g., network card, modem, etc.) that enable computer server 12 to communicate with one or more other computing devices. Such communication can occur via Input/Output (I/O) interfaces 22. Still yet, computer server 12 can communicate with one or more networks such as a local area network (LAN), a general wide area network (WAN), and/or a public network (e.g., the Internet) via network adapter 20.

As depicted, network adapter 20 communicates with the other components of computer server 12 via bus 18. It should be understood that although not shown, other hardware and/or software components could be used in conjunction with computer server 12. Examples, include, but are not limited to: microcode, device drivers, redundant processing units, and external disk drive arrays, RAID systems, tape drives, and data archival storage systems, etc. Thus, one or more embodiments can make use of software running on a general purpose computer or workstation.

With reference to FIG. 10, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer).

The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media. Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers. Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 10) running a server program. It will be understood that such a physical server may or may not include a display and keyboard. One or more embodiments can be at least partially implemented in the context of a cloud or virtual machine environment, although this is exemplary and non-limiting.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
  obtaining a plurality of historical forecasts for a plurality of time steps and at least one location among a plurality of locations;
  obtaining a plurality of historical conditions for the plurality of time steps and for the at least one location;
  training a machine learning algorithm to produce an aggregate historical forecast in response to the plurality of historical conditions and the plurality of historical forecasts; and
  producing an aggregate current forecast by running the trained machine learning algorithm on at least a plurality of current forecasts,
  wherein the plurality of historical forecasts and the plurality of current forecasts vary in at least one of spatial resolution or temporal resolution,
  wherein the plurality of historical forecasts and the plurality of current forecasts include a first forecast that is valid for a first time step and a second forecast that is valid for a second time step, wherein the plurality of historical forecasts vary in temporal resolution,
wherein training the machine learning algorithm includes:
generating a first weight matrix and a first bias vector by running the machine learning algorithm on a first group of the plurality of historical forecasts and a first group of the plurality of historical conditions; and
generating a second weight matrix and a second bias vector by running the machine learning algorithm on a second group of the plurality of historical forecasts and a second group of the plurality of historical conditions.

2. The method of claim 1 wherein the machine learning algorithm is a recurrent neural network that incorporates a plurality of weight matrices and a plurality of bias vectors corresponding to differing temporal resolutions of the plurality of historical forecasts and the plurality of historical conditions.

3. The method of claim 1 wherein the machine learning algorithm is a recurrent convolutional neural network that incorporates a plurality of kernels corresponding to differing spatial resolutions of the plurality of historical forecasts and the plurality of historical conditions.

4. The method of claim 1 wherein the plurality of historical forecasts vary in spatial resolution,
wherein training the machine learning algorithm includes:
generating a first kernel by running the machine learning algorithm on a first group of the plurality of historical forecasts and a first group of the plurality of historical conditions; and
generating a second kernel by running the machine learning algorithm on a second group of the plurality of historical forecasts and a second group of the plurality of historical conditions.

5. The method of claim 1 wherein running the trained machine learning algorithm includes running the first kernel on a first group of the plurality of current forecasts that are valid for a first time step and running the second kernel on a second group of the plurality of current forecasts that are valid for a second time step.

6. The method of claim 1 wherein producing the aggregate current forecast includes running the trained machine learning algorithm on the plurality of current forecasts and on at least one of the plurality of historical conditions.

7. A non-transitory computer readable medium that embodies computer executable instructions, which when executed by a computer cause the computer to facilitate the method of:
obtaining a plurality of historical forecasts for a plurality of time steps and at least one location among a plurality of locations;
obtaining a plurality of historical conditions for the plurality of time steps and the at least one location;
training a machine learning algorithm to produce an aggregate historical forecast in response to the plurality of historical conditions and the plurality of historical forecasts; and
producing an aggregate current forecast by running the trained machine learning algorithm on at least a plurality of current forecasts,
wherein the plurality of historical forecasts and the plurality of current forecasts vary in at least one of spatial resolution or temporal resolution,
wherein the plurality of historical forecasts and the plurality of current forecasts include a first forecast that is valid for a first time step and a second forecast that is valid for a second time step,
wherein the plurality of historical forecasts vary in spatial resolution,
wherein training the machine learning algorithm includes:
generating a first kernel by running the machine learning algorithm on a first group of the plurality of historical forecasts and a first group of the plurality of historical conditions; and
generating a second kernel by running the machine learning algorithm on a second group of the plurality of historical forecasts and a second group of the plurality of historical conditions.

8. The non-transitory computer readable medium of claim 7 wherein the machine learning algorithm is a recurrent neural network that incorporates a plurality of weight matrices and a plurality of bias vectors corresponding to differing temporal resolutions of the plurality of historical forecasts and the plurality of historical conditions.

9. The non-transitory computer readable medium of claim 7 wherein the machine learning algorithm is a recurrent convolutional neural network that incorporates a plurality of kernels corresponding to differing spatial resolutions of the plurality of historical forecasts and the plurality of historical conditions.

10. The non-transitory computer readable medium of claim 7 wherein the plurality of historical forecasts vary in temporal resolution,
wherein training the machine learning algorithm includes:
generating a first weight matrix and a first bias vector by running the machine learning algorithm on a first group of the plurality of historical forecasts and a first group of the plurality of historical conditions; and
generating a second weight matrix and a second bias vector by running the machine learning algorithm on a second group of the plurality of historical forecasts and a second group of the plurality of historical conditions.

11. The non-transitory computer readable medium of claim 7 wherein running the trained machine learning algorithm includes running the first kernel on a first group of the plurality of current forecasts that are valid for a first time step and running the second kernel on a second group of the plurality of current forecasts that are valid for a second time step.

12. The non-transitory computer readable medium of claim 7 wherein producing the aggregate current forecast includes running the trained machine learning algorithm on the plurality of current forecasts and on at least one of the plurality of historical conditions.

13. An apparatus comprising:
a memory that embodies computer executable instructions; and
at least one processor, coupled to the memory, that is operative by the computer executable instructions to facilitate a apparatus of:
obtaining a plurality of historical forecasts for a plurality of time steps and at least one location among a plurality of locations;
obtaining a plurality of historical conditions for the plurality of time steps and the at least one location;
training a machine learning algorithm to produce an aggregate historical forecast in response to the plurality of historical conditions and the plurality of historical forecasts; and
producing an aggregate current forecast by running the trained machine learning algorithm on at least a plurality of current forecasts, wherein the plurality of historical forecasts and the plurality of current forecasts vary in at least one of spatial resolution or temporal resolution, wherein the plurality of historical forecasts and the plurality of current forecasts include a first forecast that is valid for a first time step and a second forecast that is valid for a second time step, wherein the plurality of historical forecasts vary in spatial resolution, wherein training the machine learning algorithm includes:

generating a first kernel by running the machine learning algorithm on a first group of the plurality of historical forecasts and a first group of the plurality of historical conditions; and generating a second kernel by running the machine learning algorithm on a second group of the plurality of historical forecasts and a second group of the plurality of historical conditions.

14. The apparatus of claim 13 wherein the machine learning algorithm is a recurrent neural network that incorporates a plurality of weight matrices and a plurality of bias vectors corresponding to differing temporal resolutions of the plurality of historical forecasts and the plurality of historical conditions.

15. The apparatus of claim 13 wherein the machine learning algorithm is a recurrent convolutional neural network that incorporates a plurality of kernels corresponding to differing spatial resolutions of the plurality of historical forecasts and the plurality of historical conditions.

16. The apparatus of claim 13 wherein the plurality of historical forecasts vary in temporal resolution, wherein training the machine learning algorithm includes:

generating a first weight matrix and a first bias vector by running the machine learning algorithm on a first group of the plurality of historical forecasts and a first group of the plurality of historical conditions; and generating a second weight matrix and a second bias vector by running the machine learning algorithm on a second group of the plurality of historical forecasts and a second group of the plurality of historical conditions.

17. The apparatus of claim 13 wherein producing the aggregate current forecast includes running the trained machine learning algorithm on the plurality of current forecasts and on at least one of the plurality of historical conditions.

* * * * *